(12) United States Patent
Liu et al.

(10) Patent No.: US 10,385,189 B2
(45) Date of Patent: Aug. 20, 2019

(54) GRAPHENE COMPOSITE POWDER FORM MATERIAL AND METHOD FOR MAKING THE SAME

(71) Applicants: NINGBO MORSH TECHNOLOGY CO., LTD., Ningbo (CN); NINGBO INSTITUTE OF MATERIALS TECHNOLOGY AND ENGINEERING, CHINESE ACADEMY OF SCIENCES, Ningbo (CN)

(72) Inventors: Zhaoping Liu, Ningbo (CN); Xufeng Zhou, Ningbo (CN); Changlin Tang, Ningbo (CN); Zhihong Qing, Ningbo (CN); Yongsheng Zhao, Ningbo (CN)

(73) Assignees: NINGBO MORSH TECHNOLOGY CO., LTD., Ningbo (CN); NINGBO INSTITUTE OF MATERIALS TECHNOLOGY AND ENGINEERING, CHINESE ACADEMY OF SCIENCES, Ningbo (CN)

( * ) Notice: Subject to any disclaimer, the term of this patent is extended or adjusted under 35 U.S.C. 154(b) by 222 days.

(21) Appl. No.: 14/997,485

(22) Filed: Jan. 16, 2016

(65) Prior Publication Data
US 2016/0200580 A1 Jul. 14, 2016

Related U.S. Application Data

(63) Continuation of application No. PCT/CN2015/070490, filed on Jan. 12, 2015.

(51) Int. Cl.
*B32B 5/16* (2006.01)
*C08K 9/08* (2006.01)
(Continued)

(52) U.S. Cl.
CPC .............. *C08K 9/08* (2013.01); *C01B 32/182* (2017.08); *C01B 32/194* (2017.08);
(Continued)

(58) Field of Classification Search
CPC ......... C01B 32/15; B82Y 40/00; B82Y 30/00; Y10T 428/2982; Y10T 428/2991; Y10T 428/2998
(Continued)

(56) References Cited

U.S. PATENT DOCUMENTS

| 2007/0158618 A1* | 7/2007 | Song ...................... B82Y 30/00 252/500 |
| 2010/0096595 A1* | 4/2010 | Prud'Homme ........ B82Y 30/00 252/500 |

OTHER PUBLICATIONS

Song, Graphene functionalization and its application to polymer composite materials, Nanomaterials and Energy, 2 (2), pp. 97-111. (Year: 2013).*

(Continued)

*Primary Examiner* — Hoa (Holly) Le

(57) ABSTRACT

The present invention provides a graphene composite powder form material that is suitable for industrialized application. The graphene composite powder form material is composited by graphene materials and a high-molecular compound. The high-molecular compound is uniformly coated on surfaces of the graphene material. Any adjacent graphene materials are separated by the high-molecular compound. An apparent density of the graphene composite powder form material is larger than or equal to 0.02 g/cm³. Under an external pressure, the graphene materials in the graphene composite powder form material do not re-stack, and can be easily restored to original form, which benefit the storage and transportation. Besides, the graphene composite powder form material has a good compatibility in other material systems, which greatly broadens the application (Continued)

fields in the downstream products and successfully solves the problem in industrial application. The present invention also provides a method for making the graphene composite powder form material.

7 Claims, 3 Drawing Sheets

(51) Int. Cl.
    *C01B 32/182* (2017.01)
    *C01B 32/194* (2017.01)
    *C08K 3/04* (2006.01)
(52) U.S. Cl.
    CPC ............ *C01B 2204/32* (2013.01); *C08K 3/04* (2013.01); *C08K 2201/011* (2013.01); *Y10T 428/298* (2015.01); *Y10T 428/2998* (2015.01)
(58) Field of Classification Search
    USPC ....... 428/403, 407; 423/445 R, 448; 977/786
    See application file for complete search history.

(56) References Cited

OTHER PUBLICATIONS

Ramanathan et al, Functionalized graphene sheets for polymer nanocomposites, Nature Nanotechnology, vol. 3, 327-331, Jun. 2008 (Year: 2008).*

Kim et al., Graphene/Polynner Nanocomposites, Macromolecules 2010, 43, 6515-6530 DOI: 10.1021/ma100572e (Year: 2010).*

* cited by examiner

GRAPHENE COMPOSITE POWDER FORM MATERIAL AND METHOD FOR MAKING THE SAME

TECHNICAL FIELD

The present invention relates to the field of graphene materials technology, and particularly relates to a graphene composite powder form material and method for making the same that are beneficial to downstream product applications.

BACKGROUND

Graphene is a single layer sheet shaped structure that is composed of carbon atoms, and is a two dimensional material with one carbon-atom-thickness. Graphene shows excellent properties in many aspects. As an example, graphene is almost completely transparent and has a good light transmittance, by which only 2.3% of light is absorbed. A thermal conductivity of graphene reaches 5300 W/m·K, which is greater than carbon nanotube and diamond. An electron mobility of graphene at room temperature is greater than 15000 $cm^2$/V·s, which is greater than carbon nanotube and silicon crystal. Graphene has the smallest electrical resistance in all known materials. An electrical resistivity of graphene is only about $10^{-6}$ Ω·cm which is lower than electrical resistivity of copper or silver. Besides, graphene is the most thin but hard material. Forming graphene into powder form is beneficial to the applications of graphene. For example, the graphene material powder can be used as an additive to improve electrical and mechanical properties of a high molecular material. The graphene material powder has broad application prospects.

Currently, graphene material powder can be produced by various methods, such as mechanical exfoliating method, oxidizing-reducing method, epitaxial growth method of crystal, chemical vapor deposition method, organic synthesizing method, and carbon nanotube exfoliating method. In these methods, the oxidizing-reducing method, which has a low cost and is easy to be processed, is the best way to form the graphene powder. However, the graphene powder formed by this method has a small density, which could be dusty in use, and is difficult to be stored and transported. Therefore, how to produce a graphene powder material that is beneficial to the applications in the downstream products is a crucial problem in the industrialization of graphene.

Chinese patent application No. 201310200469.5 discloses a method for making graphene material powder. In the method, graphite is added to and stirred uniformly in a mixing solution containing oxidizing and intercalating agents. The achieved mixing solution is ultrasonically processed while a helium gas is introduced to form a graphite intercalating compound that is intercalated with the intercalating agent and the helium moleculars. The graphite intercalating compound is filtered, washed, dried, and then heated in air. The heated graphite intercalating compound is dispersed in an organic solvent, and is ultrasonically exfoliated again while the helium gas is continuously introduced. The twice ultrasonically exfoliated graphite intercalating compound is then centrifugalized, deposited, filtered, washed, and then dried to achieve the graphene material powder. However, the graphene material powder formed by this method has a high aggregating degree and a poor dispersing ability, which are disadvantageous for the applications of the graphene material powder in the downstream products.

Chinese patent application No. 201010593157.1 discloses another method for making graphene material powder. In this method, an oxidized graphite is uniformly exfoliated to form a graphene oxide suspended liquid solution. The obtained graphene oxide suspended liquid solution is then sprayed to remove the solvent therein to achieve the graphite oxide powder. The graphene oxide powder experiences a non-expansion thermal treatment in an inert atmosphere or a reducing atmosphere to achieve the graphene material powder, which has a lower aggregating degree and a better dispersing ability. However, the graphene material powder formed by this method has a small density and a large volume, which are inconvenient for the storage and transportation. Under an external pressure, the graphene material powder formed by this method is easy to be re-stacked and is difficult to be restored to the original form. The graphene material powder can be dusty in use, which is disadvantageous for the applications in the downstream products.

SUMMARY

Therefore, an object of the present invention is to provide a graphene composite powder form material that is beneficial to the applications in the downstream products and a method for making the same to solve the above described problems.

A graphene composite powder form material is composited by graphene materials and a high-molecular compound. The high-molecular compound is uniformly coated on surfaces of the graphene material, and any adjacent graphene materials are separated by the high-molecular compound. An apparent density of the graphene composite powder form material is larger than or equal to 0.02 $g/cm^3$.

A method for making the graphene composite powder form material comprises steps of:

step 1: preparing a graphene slurry having a concentration of 0.1%~3% by weight, and forming a medium slurry by adding a high-molecular compound to the graphene slurry according to a weight ratio of the graphene materials to the high-molecular compound of 1:0.01~1:100; and step 2: drying the medium slurry by common drying, hot pressing, freeze drying, spray drying, or granulating drying, to achieve the graphene composite powder form material.

A method for making the graphene composite powder form material comprises steps of:

(1) forming a mixing solution by adding a first monomer of polymer, graphene materials, and micro/nano structure materials into water, a weight ratio of the first monomer, the graphene materials, and the micro/nano structure materials is (0.01~1):(0.1~1):(5~1);

(2) introducing a water soluble initiator to react the mixing solution at a temperature of 30° C.~100° C. for 1 hour~10 hours, a weight ratio of the water soluble initiator to the first monomer is 1:10~1:100; and (3) drying to obtained the graphene composite powder form material.

A method for making the graphene composite powder form material comprises steps of:

(1) stirring a mixture of micro/nano structure materials, a second polymer, and an amine organic compound at a temperature of 40° C.~100° C. for 2 hours~6 hours, then performing filtering and drying processes to achieve modified micro/nano structure materials, a weight ratio of the amine organic compound to the micro/nano structure materials is 10:1~100:1;

(2) obtaining an ethanol water solution by mixing water and ethanol, and adding a silane coupling agent having an aromatic group to the ethanol water solution to form a first solution, a weight ratio of the water to the ethanol is 1:5~1:8, a weight ratio of the silane coupling agent to the ethanol water solution is 1:1~10:1;

(3) providing a graphene containing water solution, obtaining a modified graphene containing mixing solution by introducing the first solution to the graphene containing water solution and stirring at a temperature of 40° C.~100° C. for 1 hour~3 hours, a weight percentage of the graphene materials in the graphene containing water solution is 0.5%~3%, a weight ratio of the graphene materials to the silane coupling agent is 5:1~20:1, a weight ratio of the graphene materials to the second polymer is 1:0.01~1:100; and (4) adding the modified micro/nano structure materials to the modified graphene containing mixing solution to have a reaction, then performing filtering and drying processes to achieve the graphene composite powder form material, the micro/nano structure materials are attached to the surfaces of the modified graphene materials in the graphene composite powder form material.

Comparing to prior art, the present invention of the graphene composite powder form material is composited by the graphene materials and the high molecular compound or composited by the graphene materials and the micro/nano structure materials. The surfaces of the graphene materials are uniformly coated by the high molecular compound or the micro/nano structure materials to form a separation between the adjacent graphene materials. Therefore, the graphene materials in the graphene composite powder form material of the present invention do not entangle with each other, nor aggregate with each other, and are easy to be dispersed in a solvent, which effectively solves the dusty problem in packaging and using of common commercial graphene powder materials, and benefits further applications in the downstream products. The present invention also provides methods for making the graphene composite powder form material, which are simple and suitable for industrialization.

DETAILED DESCRIPTION

Figure 1:
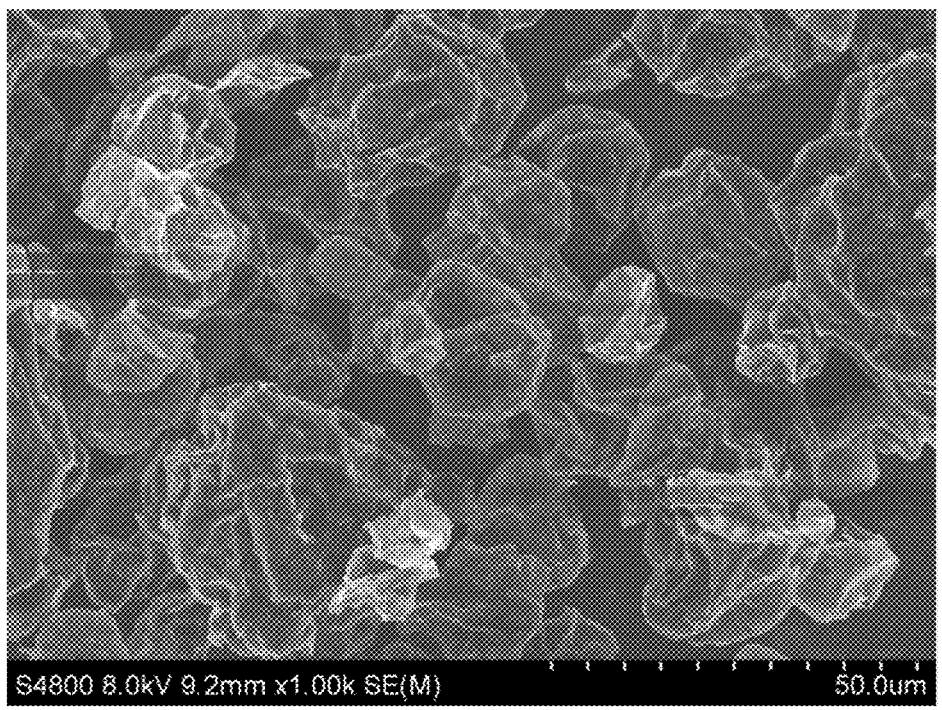
FIG. 1 is a scanning electron microscope (SEM) photo of a graphene composite powder form material in Example 1.

The disclosure is illustrated by way of example and not by way of limitation in the figures of the accompanying drawings in which like references indicate similar elements.

An embodiment of a graphene composite powder form material comprises graphene materials and a high-molecular compound. The high-molecular compound is composited with the graphene materials. The surfaces of the graphene materials are uniformly coated with the high-molecular compound. The adjacent graphene materials are separated from each other by the high-molecular compound.

An apparent density of the graphene composite powder form material is larger than or equal to 0.02 g/cm$^3$, and is preferred to be 0.05 g/cm$^3$~0.2 g/cm$^3$. When the apparent density is smaller than 0.02 g/cm$^3$, the graphene composite powder form material is easy to be dispersed in application. When the apparent density is larger than 0.2 g/cm$^3$, the dispersing difficulty of the graphene composite powder form material increases. Therefore, when the apparent density is 0.05 g/cm$^3$~0.2 g/cm$^3$, the graphene composite powder form material is not dusty in application and is easy to be dispersed in variety of solvents. In the graphene composite powder form material, a weight ratio of the graphene materials to the high-molecular compound can be 1:0.01~1:100. A more advantageous weight ratio of the graphene materials to the high-molecular compound can be determined by the practical application of the graphene composite powder form material. For example, when being used as common graphene materials, the graphene composite powder form material has the weight ratio of 1:0.01~1:0.1. However, when being used as graphene materials for battery, the graphene composite powder form material has the weight ratio of 1:0.1~1:10.

The graphene materials can be at least one of graphene nanosheets, graphene microsheets, graphene nanoribbons, few-layer graphenes (2~5 layers), large-layer graphenes (2~9 layers), graphene quantum dots, chemical modified graphenes (e.g., graphene oxides, reduced graphene oxides), and derivatives thereof. The definition of the graphene materials can be found in the article of "All in the graphene family—A recommended nomenclature for two-dimensional carbon materials." A thickness of the graphene materials can be smaller than or equal to 20 nm, or more preferred, can be smaller than or equal to 10 nm. In one embodiment, the thickness of the graphene materials is preferred to be smaller than or equal to 3 nm. The thinner the graphene materials, the better the flexibility, and the easier the processing. The method for forming the graphene materials is not limited and can be conventional. In one preferred embodiment, the graphene materials are purchased from Ningbo Morsh Technology. Co., Ltd. The graphene materials can be obtained by having a thermal expansion to the graphene oxides obtained by a chemical oxidizing method, such as Brodic method, Hummers method, or Staudenmaier method. The graphene materials also can be obtained by using mechanical exfoliating method, liquid exfoliating method, or electrochemical exfoliating method. The graphene oxides or other chemical modified graphene materials also can be used in the present invention.

The high-molecular compound can be water soluble or oil soluble. The water soluble high-molecular compound can be selected from at least one of polyvinyl alcohol (PVA), polyethylene glycol (PEG), polyacrylamide (PAM), polyvinyl pyrrolidone (PVP), cellulose acetate (CA), carboxymethylcellulose sodium (CMC), and polyglutamic acid. The oil soluble high-molecular compound can be selected from at least one of vinylidene fluoride-hexafluoropropylene copolymer (PVDF-HFP), polyvinylidene fluoride (PVDF), polymethyl methacrylate (PMMA), polyacrylic acid sodium resins, ethylene-vinyl alcohol copolymer (EVAL), polyvinyl alcohol (PVA), polyethylene glycol (PEG), polyacrylamide (PAM), polyvinyl pyrrolidone (PVP), cellulose acetate (CA), carboxymethylcellulose sodium (CMC), and polyglutamic acid. The solvent used to dissolve the oil soluble high-molecular compound can be selected from at least one of N-methylpyrrolidone (NMP), dimethyl formamide (DMF), dimethyl acetamide (DMAc), and acetone. The high-molecular compound is used to separate the adjacent graphene materials to achieve a good dispersing ability of the graphene composite powder form material in the applications for downstream products. Besides, in practical use, by selecting the specific kind of high-molecular compound that has a good compatibility in the application system, more advantages of the graphene composite powder form material can be achieved.

The graphene composite powder form material adopts the high-molecular compound as an isolation between the adjacent graphene materials. Therefore, the graphene materials in the graphene composite powder form material do not entangle with each other. Under an external pressure, the graphene materials do not re-stack, and can be dispersed from each other easily. The graphene composite powder form material has a specific range of particle size and a relatively large apparent density, which benefit the storage and transportation, and effectively solve the dusty problem in packaging and using of common commercial graphene powder materials. Further, the graphene composite powder form material has a good compatibility in other material systems, which broadens the application fields of the graphene material powder in the downstream products. The graphene composite powder form material can be widely used in the fields of conducting additive in lithium ion battery, conducting coating, anti-corrosive painting, heat dissipating painting, teflon coating, conducting ink, and plastic, which solves the problem of the graphene materials in application.

In one preferred embodiment, the graphene composite powder form material comprise a plurality of graphene material assemblies, and the plurality of graphene material assemblies are formed by the graphene materials and the high-molecular compound.

Each of the graphene material assemblies has a shape that is not limited and can be a grain shape or a semi-sphere shape. For the convenience, the semi-sphere shaped graphene material assembly is also named as graphene composite sphere. A diameter of the graphene material assembly is 10 μm to 300 μm, and is preferred to be 30 μm~150 μm. In the present embodiment, the diameter of the graphene material assembly is 50 μm~100 μm to make the graphene material assembly have a relatively high apparent density that is not dusty in use. The assembly has an apparent density that is larger than or equal to 0.02 g/cm$^3$, and in one preferred embodiment is 0.05 g/cm$^3$~0.2 g/cm$^3$. When the apparent density is greater than 0.2 g/cm$^3$, the graphene material assemblies are difficult to be dispersed from each other. Therefore, when the apparent density of the graphene material assemblies is 0.05 g/cm$^3$~0.2 g/cm$^3$, the graphene material assemblies are not dusty and are easy to be dispersed in variety of solvents. It can be understood that, when the graphene materials and the high-molecular compound are existed as the form of the graphene material assemblies in the graphene composite powder form material, the graphene material assemblies have a macroscopic structure and a relatively large apparent density, and are not dusty in the storage and transportation, which benefits the applications in the downstream products.

The graphene material assembly is composited by the graphene materials and the high-molecular compound. The surfaces of the graphene materials are uniformly coated by the high-molecular compound to separate the adjacent graphene materials. When the weight ratio of the graphene materials to the high-molecular compound is larger than 1:10, the high-molecular compound is a continuous phase in the graphene material assembly and is a high-molecular matrix, and the graphene materials are dispersed in the high-molecular matrix. Thus, the optimization of the structure and the application performance of the graphene material assembly is achieved. In this condition, not only the graphene materials are effectively separated from each other, but also the graphene material assembly has a stable structure, with which the graphene material assembly is not easily to be scattered or dusty during a crush, and is convenient for the storage and transportation. Meanwhile, the own excellent performance of the graphene materials can be maintained.

When the graphene composite powder form material of the present invention is consisted by a plurality of graphene material assemblies that have a specific designed structure, the adjacent graphene materials are separated from each other by the high-molecular compound in the graphene material assembly. Therefore, the graphene materials do not entangle with each other. Under an external pressure, the graphene materials do not re-stack, and can be dispersed from each other easily. The graphene material assemblies have a specific range of particle size and a relatively large apparent density, which benefit the storage and transportation, and effectively solve the dusty problem in packaging and using of common commercial graphene powder materials. Further, the graphene composite powder form material has a good compatibility in other material systems, which broadens the application fields of the graphene material powder in the downstream products. The graphene composite powder form material can be widely used in the fields of conducting additive in lithium ion battery, conducting coating, anti-corrosive painting, heat dissipating painting, teflon coating, conducting ink, and plastic, which successfully solves the problem of the graphene materials in application.

It is to be understood that, the special structure, density, and diameter of the graphene material assemblies are not only suitable for the graphene composite powder form material but also can be used in other carbonaceous materials, such as carbon nanotubes, nano graphite, carbon black, or carbon nanofibers. Besides, the special structure is also suitable for any other layer shaped materials, such as anionic layered compounds (mainly are hydrotalcite layered compounds), cationic layered compounds (natural ones are montmorillonite, smectite, etc.; synthetic ones mainly are insoluble tetravalent metal salts, such as phosphates, silicates, titanates, arsenates, etc.), neutral layered compounds, such as mica, layered dichalcogenides, layered transition metal oxides (vanadium oxide compounds, molybdenum compounds, molybdic acids, tungstic acid, etc.), and layered halides.

Comparing to prior art, the graphene composite powder form material provided by the present invention is composited by the graphene materials and the high-molecular compound. The surfaces of the graphene materials are uniformly coated by the high-molecular compound to separate any adjacent graphene materials from each other by the high-molecular compound. Therefore, the graphene materials in the graphene composite powder form material of the present invention do not entangle with each other, do not re-stack under the external pressure, and are easy to be dispersed in a solvent. Advantageously, the graphene composite powder form material can comprise a plurality of graphene material assemblies with a specially designed structure. The graphene material assemblies have a grain shape or a semi-sphere shape, and have a diameter of 10 μm~300 μm. An apparent density of the graphene composite powder form material is larger than or equal to 0.02 g/cm$^3$, and in one preferred embodiment is 0.05 g/cm³~0.2 g/cm³. For the high apparent density, the graphene composite powder form material can effectively solve the dusty problem in packaging and using of common commercial graphene powder materials. The graphene composite powder form material can have a good compatibility with other system, which broadens the application fields in the downstream products. The graphene composite powder form material can be widely used in the fields of conducting additive in lithium ion battery, conducting coating, anticorrosive painting, heat dissipating painting, teflon coating, conducting ink, and plastic, which successfully solves the problem of the graphene materials in application. Additionally, to further broaden the application fields for the graphene composite powder form material, the graphene composite powder form material can also comprise at least one of carbon nanotubes, nano graphite, carbon black, carbon nanofibers, and grains having a layer shaped structure.

The present invention also provide methods for making the graphene composite powder form material, which are simple and suitable for industrialization. A first embodiment of a method for making the graphene composite powder form material comprises steps of:

step S110, preparing a water soluble graphene slurry having a concentration of 0.1%~3% by weight, and forming a medium slurry by adding a high-molecular compound to the water soluble graphene slurry according to a weight ratio of the graphene materials to the high-molecular compound of 1:0.01~1:100; and step S120, drying the medium slurry by common drying, hot pressing, freeze drying, spray drying, or granulating drying, to achieve the graphene composite powder form material.

In step S110, the source and preparing method for the graphene materials are not limited and can be conventional. In one preferred embodiment, the graphene materials are purchased from Ningbo Morsh Technology. Co., Ltd. The graphene materials can be obtained by having a thermal expansion to the graphene oxides obtained by a chemical oxidizing method, such as Brodic method, Hummers method, or Staudenmaier method. The graphene materials also can be obtained by using mechanical exfoliating method, liquid exfoliating method, or electrochemical exfoliating method. The high-molecular compound is a water soluble high-molecular compound that can be selected from at least one of polyvinyl alcohol (PVA), polyethylene glycol (PEG), polyacrylamide (PAM), polyvinyl pyrrolidone (PVP), cellulose acetate (CA), carboxymethylcellulose sodium (CMC), and polyglutamic acid.

In step S120, the drying step is performed at a temperature that is larger than 50° C., and is equal to or smaller than 200° C. In one embodiment, the drying temperature is greater than 150° C., and is equal to or smaller than 200° C., which makes the dried high-molecular compound become a continuous phase in the achieved graphene material assemblies to enhance the pressing resistance and dispersing ability of the graphene material assemblies.

The graphene composite powder form material achieved by this method can comprise a plurality of graphene material assemblies. Each of the graphene material assemblies comprises the plurality of graphene materials and the high-molecular compound composited with each other. The surfaces of the graphene materials are uniformly coated by the high-molecular compound as a separation between any adjacent graphene materials.

Before step S120, the method can further comprise a step of flocculating the medium slurry, which comprises steps of:

S11, slowly adding a poor solvent into the medium slurry during stirring of the medium slurry, to co-flocculate the graphene materials and the high-molecular compound to form graphene/high-molecular compound flocculation assemblies, the poor solvent comprises water or ethanol;

S12, filtering the medium slurry to achieve the graphene/high-molecular compound flocculation assemblies; and S13, drying the graphene/high-molecular compound flocculation assemblies.

It is to be understood that, in the method for making the graphene composite powder form material of the present invention, the special technical strategies and specific materials are cooperative with each other, with which the graphene composite powder form material formed from the method has a specific structure, diameter, and density, and a good compatibility in the solvents. Besides, the method for making the graphene composite powder form material has a low cost and is easy to be realized. In summary, the method for making the graphene composite powder form material successfully solves the problem of the graphene materials in application and is suitable for industrialization.

A second embodiment of the method for making the graphene composite powder form material comprises steps of: step S210, preparing an oil soluble graphene slurry having a concentration of 0.1%~3% by weight, and forming a medium slurry by adding a high-molecular compound to the water soluble graphene slurry according to a weight ratio of the graphene materials to the high-molecular compound of 1:0.01~1:100; and step S220, drying the medium slurry by common drying, hot pressing, freeze drying, spray drying, or granulating drying, to achieve the graphene composite powder form material.

In step S210, the high-molecular compound is the oil soluble high-molecular compound that can be selected from at least one of vinylidene fluoride-hexafluoropropylene copolymer (PVDF-HFP), polyvinylidene fluoride (PVDF), polymethyl methacrylate (PMMA), polyacrylic acid sodium resins, ethylene-vinyl alcohol copolymer (EVAL), polyvinyl alcohol (PVA), polyethylene glycol (PEG), polyacrylamide (PAM), polyvinyl pyrrolidone (PVP), cellulose acetate (CA), carboxymethylcellulose sodium (CMC), and polyglutamic acid. The solvent used to dissolve the oil soluble high-molecular compound can be selected from at least one of N-methylpyrrolidone (NMP), dimethyl formamide (DMF), dimethyl acetamide (DMAc), and acetone.

In step S220, the drying step is performed at a temperature that is larger than 50° C. and equal to or smaller than 200° C. In one embodiment, the drying temperature is greater than 150° C. and equal to or smaller than 200° C., which makes the high-molecular compound become a continuous phase in the achieved graphene material assembly to enhance the pressing resistance and dispersing ability of the graphene material assemblies.

The graphene composite powder form material achieved by this method can comprise a plurality of graphene material assemblies. Each of the graphene material assemblies comprises the plurality of graphene materials and the high-molecular compound composited with each other. In the graphene material assembly, the surfaces of the graphene materials are uniformly coated by the high-molecular compound as a separation between any adjacent graphene materials.

Before the drying in step S220, the method can further comprise a step of flocculating the medium slurry comprising:

S21, slowly adding a poor solvent into the medium slurry during stirring of the medium slurry, to co-flocculate the graphene materials and the high-molecular compound to form graphene/high-molecular compound flocculation assemblies, the poor solvent comprises at least one of diethyl ether, petroleum ether, cyclohexane, hexane, and acetone;

S22, filtering the medium slurry to achieve the graphene/high-molecular compound flocculation assemblies.

The step of flocculating can more uniformly coat the high-molecular compound on the surfaces of the graphene materials.

Another embodiment of the graphene composite powder form material comprises a plurality of graphene materials and a plurality of micro/nano structure materials attached to the surfaces of the plurality of graphene materials. The micro/nano structure materials are firmly combined with the graphene materials.

The graphene materials are the same with the graphene materials in the above embodiments. The micro/nano structure material comprises nano sized, micro-nano sized, or micro sized material of at least one of the carbon black, super-P, diamond, boron nitride, silicon nitride, silicon dioxide, aluminum oxide, barium sulfate, carbon nanotube, carbon fiber, graphite, metal powder, silicon, montmorillonite, and hydrotalcite. The metal powder comprises at least on of silver powder, copper powder, zinc powder, and aluminum powder. The nano sized material has a diameter of about 10 nm~about 100 nm (e.g., 20 nm~50 nm). The micro-nano sized material has a diameter of about 100 nm~about 1 µm (e.g., 200 nm~500 nm). The micro sized material has a diameter of about 1 µm~300 µm. The doping of the micro/nano structure materials in the graphene materials can increase the density of the graphene composite powder form material that avoids the dusty situation in use and benefits the industrializing application. A weight ratio of the micro/nano structure materials to the graphene materials in the graphene composite powder form material is in a range from 0.1:1~5:1, a preferred range from 1:3~3:1, or a more preferred range from 1:2~2:1.

The graphene materials can be modified graphene materials that are formed by modifying the graphene materials with a first monomer or a silane coupling agent. When the graphene materials are modified with the first monomer, the micro/nano structure materials can be grafted with a first polymer. That is, the graphene composite powder form material further comprises the first polymer. The graphene materials and the micro/nano structure materials are both dispersed in the first polymer. The graphene materials can be combined with the micro/nano structure materials through the first polymer as a bridge. Through this, the high conductive micro/nano structure materials can be dispersedly composited in the graphene materials. That improves the dispersing ability of the graphene composite powder form material and makes it not to be easily aggregated. The micro/nano structure materials has a better conductivity compared with the first polymer, and can improve the conductivity of the graphene composite powder form material. Thereby, the graphene composite powder form material has an excellent industrializing application prospect.

When the graphene materials are modified with the silane coupling agent having an aromatic group, the micro/nano structure materials can be modified micro/nano structure materials that are formed by modifying the micro/nano structure materials with an amine organic compound. The π electron of the graphene materials and the aromatic group of the silane coupling agent produce a strong π-π conjugation, with which the surfaces of the structures can have an active oxygen containing functional group, such as a phenolic group. The surfaces of the micro/nano structure materials commonly have an oxygen containing functional group, such as —COOH or —OH, which can have an amide reaction with an amino group in the amine organic compound to introduce an alkaline group on the surfaces of the micro/nano structure materials. The active oxygen containing functional group of the graphene materials can have a chemical reaction with the alkaline group of the micro/nano structure materials to composite the graphene materials with the micro/nano structure materials. The chemical reaction of the two groups can uniformly disperse the high conductive micro/nano structure materials in the graphene materials, which can improve the dispersing ability of both the graphene materials and the micro/nano structure materials. The micro/nano structure materials can have a high conductivity, which increases the conductivity of the graphene composite powder form material. Thereby, the graphene composite powder form material has an excellent industrializing application prospect.

The graphene composite powder form material can further comprise a second polymer, which is the above described high-molecular compound. The graphene materials and the micro/nano structure materials are both dispersed in the second polymer. The graphene materials and the micro/nano structure materials are composited together through a physical action. More specifically, the micro/nano structure materials can be dispersed on the surfaces of the graphene materials due to van der Waals attractive forces, by which the micro/nano structure materials and the graphene materials are firmly combined with each other.

A weight ratio of the graphene materials and the second polymer is 1:0.01~1:100, and is preferred to be 1:0.1~1:10. The second polymer is a water soluble polymer. The water soluble polymer is selected from at least one of polyvinyl alcohol (PVA), polyethylene glycol (PEG), polyacrylamide (PAM), polyvinyl pyrrolidone (PVP), cellulose acetate (CA), carboxymethylcellulose sodium (CMC), and polyglutamic acid.

The second polymer increases the dispersing ability of the graphene composite powder form material in the applications of the downstream products. The micro/nano structure materials can have a good conductivity. Therefore, comparing with the composite material that only comprises the graphene and the second polymer, the graphene composite powder form material has a relatively high conductivity.

In the graphene composite powder form material of the present invention, the surfaces of the graphene materials are coated by the micro/nano structure materials, which form a separation between any adjacent graphene materials. Therefore, the graphene materials in the graphene composite powder form material do not entangle or aggregate with each other that benefit the dispersion. Besides, when the micro/nano structure materials are composited in the graphene materials through the first polymer or the chemical bonds, the aggregation of the micro/nano structure materials on the surfaces of the graphene materials can be prevented, and the dispersing ability between the adjacent graphene materials can be further improved. Because of the existence of the water soluble second polymer, the graphene composite powder form material is easy to be dispersed in applications in downstream products.

An embodiment of a method (1) for making the graphene composite powder form material comprises steps of:

step S310, forming a mixing solution by putting the first monomer, the graphene material, and the micro/nano structure materials into water, a weight ratio of the first monomer, the graphene material, and the micro/nano structure materials is (0.01~1):(0.1~1):(5~1);

step S320, introducing a water soluble initiator to react the mixing solution at a temperature of 30° C.~100° C. for 1 hour~10 hours, a weight ratio of the water soluble initiator to the first monomer is 1:10~1:100; and step S330, drying to obtained the graphene composite powder form material.

In step S310, the first monomer, the graphene material, and the micro/nano structure materials are previously mixed. The first monomer can disperse the graphene materials from each other. More specifically, the first monomer, the graphene material, and the micro/nano structure materials are put into water and stirred at a temperature of 30° C.~50° C. for 0.1 hour~2 hours to form the mixing solution.

The first monomer can be selected from at least one of water soluble maleic acid, maleic anhydride, fumaric acid, fumaric anhydride, acrylic acid, methacrylic acid, diallyl dimethyl ammonium chloride, acrylonitrile and water soluble acrylamide based monomer. The acrylamide based monomer can be selected from at least one of acrylamide, methacrylamide, N-tert-butyl acrylamide, diacetone acrylamide, 2-acrylamido-2-methyl-1-propanesulfonic acid, N-isopropyl acrylamide, cinnamamide, and N-(3-dimethylaminopropyl) methacrylamide. The micro/nano structure can be nano sized, micro-nano sized, or micro sized structure of at least one of the carbon black, super-P, diamond, boron nitride, silicon nitride, silicon dioxide, aluminum oxide, barium sulfate, carbon nanotube, carbon fiber, graphite, metal powder, silicon, montmorillonite, and hydrotalcite. The metal powder can be at least on of silver powder, copper powder, zinc powder, and aluminum powder.

In step S310, the step of forming the mixing solution can further comprise a step of adding a second polymer into the water. The second polymer can be a water soluble polymer. The water soluble polymer can be selected from at least one of polyvinyl alcohol, polyethylene glycol, polyacrylamide, polyvinyl pyrrolidone, cellulose acetate, carboxymethylcellulose sodium, and polyglutamic acid. A weight ratio of the graphene materials to the second polymer can be 1:0.01~1:100. The adding of the second polymer can increase the dispersing ability of the graphene composite powder form material in the applications in the downstream products.

In step S320, under the action of the water soluble initiator, the first monomer generates free radicals to polymerize the first monomer into the first polymer that has a long molecular chain and/or a branched chain. For the reason that the surfaces of the micro/nano structure materials have the oxygen containing function group, such as —COOH or —OH, the micro/nano structure materials are easy to be grafted to the first polymer with the long molecular chain and/or the branched chain. The free radicals of the first monomer have an interaction with the π electrons of the graphene materials, through which the graphene materials are firmly bonded to the first polymer. That is, the first monomer has a free radical polymerization under the action of the initiator to form the first polymer. Besides, the oxygen containing active function groups on the surfaces of the micro/nano structure materials capture the free radicals in the molecular chain of the first polymer. This process uniformly disperses the micro/nano structure materials in the first polymer, which also means that the micro/nano structure materials are uniformly dispersed in the graphene materials. In is circumstance, the cohesion force in the micro/nano structure materials dramatically decreases, and the possibility of the self-aggregation of the micro/nano structure materials dramatically decreases, which greatly improves the dispersing ability and the conductivity of the graphene composite powder form material. The grafting of the first polymer to the micro/nano structure materials not only solves the aggregation problem of the micro/nano structure materials but also uniformly disperses the micro/nano structure materials on the surfaces of the graphene materials, to achieve the graphene composite powder form material with the high dispersing ability and the high conductivity.

The water soluble initiator is used to initiate the polymerization of the first monomer. The water soluble initiator is selected from at least one of persulfate, azobisisobutyronitrile, 2,2'-Azobisisoheptonitrile, 2,2'-azobis(2-methylpropionamidine) dihydrochloride, 2,2'-azobis[2-(2-imidazolin-2-yl)propane] dihydrochloride, 2,2'-azobis[2-(2-imidazolin-2-yl)propane], and 4,4'-azobis(4-cyanovaleric acid). The polymerizing of the first monomer can be at the temperature of 40° C. to 60° C. The preferred weight ratio of the water soluble initiator to the first monomer can be 1:20 to 1:50.

An embodiment of a method (2) for making the graphene composite powder form material comprises steps of:

step S410, stirring a mixture of the micro/nano structure materials and the amine organic compound at a temperature of 40° C.~100° C. for 2 hour~6 hours, then performing filtering and drying processes to achieve the modified micro/nano structure materials, a weight ratio of the amine organic compound to the micro/nano structure materials is 10:1~100:1;

step S420, obtaining an ethanol water solution by mixing water and ethanol, and adding a silane coupling agent having an aromatic group to the ethanol water solution to form a first solution, a weight ratio of the water to the ethanol is 1:5~1:8, a weight ratio of the silane coupling agent to the ethanol water solution is 1:1~10:1;

step S430, providing a graphene containing water solution, and obtaining a modified graphene containing mixing solution by introducing the first solution to the graphene containing water solution and stirring at a temperature of 40° C.~100° C. for 1 hour 3 hours, a weight percentage of the graphene materials in the graphene containing water solution is 0.5%~3%, a weight ratio of the graphene materials to the silane coupling agent is 5:1~20:1;

step S440, adding the modified micro/nano structure materials to the modified graphene containing mixing solution to have a reaction for a period of time, then performing filtering and drying processes to achieve the graphene composite powder form material.

In step S410, the surfaces of the micro/nano structure materials have oxygen containing function groups, such as —COOH or —OH. Through the reaction of the oxygen containing function groups with the amine organic compound, the alkaline groups can be introduced on the surfaces of the micro/nano structure materials. The oxygen containing function groups of the micro/nano structure materials can have a amidation reaction with the amino groups in the amine organic compound.

The amine organic compound is selected from at least one of ethylenediamine, diethylenetriamine, triethylenetetramine, m-phenylenediamine, m-xylylenediamine, and diaminodiphenyl methane.

A preferred weight ratio of the amine organic compound to the micro/nano structure materials can be 5:1~10:1.

In step S410, the step of stirring the mixture of the micro/nano structure materials and the amine organic compound can further comprise adding a second polymer into the mixture and stirring the mixture of the micro/nano structure materials, the second polymer, and the amine organic compound. The second polymer can be a water soluble polymer. The water soluble polymer can be selected from at least one of polyvinyl alcohol, polyethylene glycol, polyacrylamide, polyvinyl pyrrolidone, cellulose acetate, carboxymethylcellulose sodium, and polyglutamic acid. A weight ratio of the graphene materials to the second polymer is 1:0.01~1:100. The adding of the second polymer can increase the dispersing ability of the graphene composite powder form material in the applications in the downstream products.

In step S420, a portion of the silane coupling agent has a hydrolyzation to produce a hydroxyl group by adding the silane coupling agent to the ethanol water solution.

The silane coupling agent having the aromatic group is selected from at least one of phenyl trimethoxysilane, phenyl triethoxysilane, diphenyl diethoxysilane, and diphenyl dimethoxysilane.

In step S430, the graphene materials are modified by the silane coupling agent having the aromatic group. The π electron on the surfaces of the graphene materials and the aromatic group of the silane coupling agent produce a strong π-π conjugation, through which the surfaces of the graphene materials have active oxygen containing functional groups, such as phenolic groups.

In step S440, the graphene materials having the active oxygen containing functional groups have a chemical reaction with the micro/nano structure materials having the alkaline groups to composite the graphene materials with the micro/nano structure materials. Due to the chemical reaction between the modified graphene materials and the micro/nano structure materials having the alkaline groups, the micro/nano structure materials are uniformly dispersed and tightly bonded on the surfaces of the graphene materials due to the chemical bonds.

The reaction time can be 2 hours~6 hours.

In this embodiment of the method, by introducing the amine organic compound to react with the oxygen containing functional groups of the micro/nano structure materials to introduce the alkaline groups on the surface of the micro/nano structure materials, while introducing the silane coupling agent having the aromatic groups, which have a very strong conjugating effect, to modify the graphene materials, a relatively strong π-π conjugation can be produced between the aromatic group and the graphene material. After the modified graphene materials are reacted with the micro/nano structure materials having the alkaline groups, the micro/nano structure materials can be successively dispersed uniformly on the surfaces of the graphene materials through the chemical bonding mean, and the bonding is very tight, to achieve the graphene composite powder form material having the high dispersing ability and high conductivity.

An embodiment of a method (3) for making the graphene composite powder form material comprises the following steps:

step S510, putting the second polymer, the graphene materials, and the micro/nano structure materials into water to achieve a mixing solution, a weight ratio of the graphene materials to the water soluble second polymer is 1:0.01~1:100, a weight ratio of the micro/nano structure materials to the graphene materials is 0.1:1~5:1; and step S520, drying the mixing solution to achieve the graphene composite powder form material.

In step S510, the second polymer, the graphene materials, and the micro/nano structure materials are physically mixed. The mixing step can be ultrasonic dispersing, stirring, or the combination thereof. The physically mixing gradually disperses the graphene materials uniformly in the second polymer. The micro/nano structure materials are gradually dispersed uniformly on the surfaces of the graphene materials due to van der Waals forces, to achieve the compositing between the micro/nano structure materials and the graphene materials. The micro/nano structure materials and the graphene materials are firmly combined through the physical action.

The second polymer is selected from one or combinations of polyvinyl alcohol (PVA), polyethylene glycol (PEG), polyacrylamide (PAM), polyvinyl pyrrolidone (PVP), cellulose acetate (CA), carboxymethylcellulose sodium (CMC), and polyglutamic acid.

This method uniformly disperses the micro/nano structure materials and the graphene materials in the second polymer through physical stirring and dispersing, to firmly combine the micro/nano structure materials and the graphene materials through the physical action, to achieve the graphene composite powder form material with the high dispersing ability and high conductivity. The method is simple and easy to be processed, and is convenient for the industrialization.

The present invention, by using the specially designed material and the special technical process, can uniformly disperses the micro/nano structure materials in the graphene materials, and the micro/nano structure materials are firmly attached to the surfaces of the graphene materials. Thus, the graphene composite powder form material made by the method has a relatively good dispersing ability, does not tend to be aggregated, and has a relatively good conductivity. Besides, the method has relatively mild reacting conditions, fewer steps, and is easy to be processed and industrialized.

Example 1-1

100 kg of graphene material slurry (the solvent is water) having a concentration of 0.1% by weight is provided. According to the condition that the weight ratio of the graphene materials to the high-molecular compound is 1:5, 0.5 kg of PVA is obtained and put into the graphene material slurry to form the medium slurry. The medium slurry is spray dried by having the inlet air temperature of 270° C. and outlet air temperature of 150° C. in the spray drying to achieve the graphene composite powder form material.

FIG. 1 is the SEM photo of the graphene composite powder form material of Example 1. It can be seen from FIG. 1 that a diameter range of the graphene composite powder form material is 10 μm~50 μm.

Example 1-2

100 kg of graphene material slurry (the solvent is water) having a concentration of 0.1% by weight is provided. According to the condition that the weight ratio of the graphene materials to the high-molecular compound is 1:5, 0.5 kg of PVA is obtained and put into the graphene material slurry to form the medium slurry. Ether is slowly added to the medium slurry during stirring until the graphene materials and the PVA are completely precipitated. Then the medium slurry is pumping filtrated and dried in an oven at 30° C.~200° C. until the solvent is completely evaporated.

Example 1-3

100 kg of graphene material slurry (the solvent is water) having a concentration of 0.1% by weight is provided. According to the condition that the weight ratio of the graphene materials to the high-molecular compound is 1:5, 0.5 kg of PVA is obtained and put into the graphene material slurry to form the medium slurry. Ether is slowly added to the medium slurry during stirring until the graphene materials and the PVA are completely precipitated. Then the medium slurry is pumping filtrated and granulated by using a granulator, followed by drying at 30° C.~200° C. until the solvent is completely evaporated. Otherwise, the co-flocculating step is omitted, and the medium slurry is directly granulated by using the granulator, followed by drying at 30° C.~200° C. until the solvent is completely evaporated.

Example 1-4

100 kg of graphene material slurry (the solvent is water) having a concentration of 0.1% by weight is provided. According to the condition that the weight ratio of the graphene materials to the high-molecular compound is 1:5, 0.5 kg of PVA is obtained and put into the graphene material slurry to form the medium slurry. The medium slurry is hot-pressing dried at 50° C.~150° C.

Example 1-5

100 kg of graphene material slurry (the solvent is water) having a concentration of 0.1% by weight is provided. According to the condition that the weight ratio of the graphene materials to the high-molecular compound is 1:5, 0.5 kg of PVA is obtained and put into the graphene material slurry to form the medium slurry. The medium slurry is freeze dried at −10° C.~−80° C. Otherwise, ether is slowly added to the medium slurry during stirring until the graphene materials and the PVA are completely precipitated. Then the medium slurry is pumping filtrated and freeze dried at −10° C.~−80° C.

Example 1-6

100 kg of graphene material slurry (the solvent is water) having a concentration of 0.1% by weight is provided. According to the condition that the weight ratio of the graphene materials to the high-molecular compound is 1:5, 0.5 kg of PVA is obtained and put into the graphene material slurry to form the medium slurry. The medium slurry is dried in an oven at 50° C.~200° C.

Example 1-7

100 kg of graphene material slurry (the solvent is water) having a concentration of 3% by weight is provided. According to the condition that the weight ratio of the graphene materials to the high-molecular compound is 1:100, 300 kg of PEG is obtained and put into the graphene material slurry to form the medium slurry. The medium slurry is spray dried by having the inlet air temperature of 240° C. and outlet air temperature of 120° C. in the spray drying to achieve the graphene composite powder form material.

Example 1-8

100 kg of graphene material slurry (the solvent is water) having a concentration of 3% by weight is provided. According to the condition that the weight ratio of the graphene materials to the high-molecular compound is 1:100, 300 kg of PEG is obtained and put into the graphene material slurry to form the medium slurry. Petroleum ether is slowly added to the medium slurry during stirring until the graphene materials and the PEG are completely precipitated. Then the medium slurry is pumping filtrated and dried in an oven at 30° C.~200° C. until the solvent is completely evaporated.

Example 1-9

100 kg of graphene material slurry (the solvent is water) having a concentration of 3% by weight is provided. According to the condition that the weight ratio of the graphene materials to the high-molecular compound is 1:100, 300 kg of PEG is obtained and put into the graphene material slurry to form the medium slurry. Petroleum ether is slowly added to the medium slurry during stirring until the graphene materials and the PEG are completely precipitated. Then the medium slurry is pumping filtrated and and granulated by using a granulator, followed by drying at 30° C.~200° C. until the solvent is completely evaporated. Otherwise, the co-flocculating step is omitted, and the medium slurry is directly granulated by using the granulator, followed by drying at 30° C.~200° C. until the solvent is completely evaporated.

Example 1-10

100 kg of graphene material slurry (the solvent is water) having a concentration of 3% by weight is provided. According to the condition that the weight ratio of the graphene materials to the high-molecular compound is 1:100, 300 kg of PEG is obtained and put into the graphene material slurry to form the medium slurry. The medium slurry is dried in an oven at 30° C.~200° C. until the solvent is completely evaporated.

Example 1-11

100 kg of graphene material slurry (the solvent is water) having a concentration of 3% by weight is provided. According to the condition that the weight ratio of the graphene materials to the high-molecular compound is 1:100, 300 kg of PEG is obtained and put into the graphene material slurry to form the medium slurry. The medium slurry is hot-pressing dried at 50° C.~150° C.

Example 1-12

100 kg of graphene material slurry (the solvent is water) having a concentration of 3% by weight is provided. According to the condition that the weight ratio of the graphene materials to the high-molecular compound is 1:100, 300 kg of PEG is obtained and put into the graphene material slurry to form the medium slurry. The medium slurry is freeze dried at −10° C.~−80° C. Otherwise, petroleum ether is slowly added to the medium slurry during stirring until the graphene materials and the PEG are completely precipitated. Then the medium slurry is pumping filtrated and freeze dried at −10° C.~−80° C.

Example 1-13

100 kg of graphene material slurry (the solvent is water) having a concentration of 1.5% by weight is provided. According to the condition that the weight ratio of the graphene materials to the high-molecular compound is 1:0.01, 0.015 kg of PEG is obtained and put into the graphene material slurry to form the medium slurry. The medium slurry is spray dried by having the inlet air temperature of 240° C. and outlet air temperature of 120° C. in the spray drying to achieve the graphene composite powder form material.

Example 1-14

100 kg of graphene material slurry (the solvent is water) having a concentration of 1.5% by weight is provided. According to the condition that the weight ratio of the graphene materials to the high-molecular compound is 1:0.01, 0.015 kg of PEG is obtained and put into the graphene material slurry to form the medium slurry. Petroleum ether is slowly added to the medium slurry during stirring until the graphene materials and the PEG are completely precipitated. Then the medium slurry is pumping filtrated and dried in an oven at 30° C.~200° C. until the solvent is completely evaporated.

Example 1-15

100 kg of graphene material slurry (the solvent is water) having a concentration of 1.5% by weight is provided. According to the condition that the weight ratio of the graphene materials to the high-molecular compound is 1:0.01, 0.015 kg of PEG is obtained and put into the graphene material slurry to form the medium slurry. Petroleum ether is slowly added to the medium slurry during stirring until the graphene materials and the PEG are completely precipitated. Then the medium slurry is pumping filtrated and and granulated by using a granulator, followed by drying at 30° C.~200° C. until the solvent is completely evaporated. Otherwise, the co-flocculating step is omitted, and the medium slurry is directly granulated by using the granulator, followed by drying at 30° C.~200° C. until the solvent is completely evaporated.

Example 1-16

100 kg of graphene material slurry (the solvent is water) having a concentration of 1.5% by weight is provided. According to the condition that the weight ratio of the graphene materials to the high-molecular compound is 1:0.01, 0.015 kg of PEG is obtained and put into the graphene material slurry to form the medium slurry. The medium slurry is dried in an oven at 30° C.~200° C. until the solvent is completely evaporated.

Example 1-17

100 kg of graphene material slurry (the solvent is water) having a concentration of 1.5% by weight is provided. According to the condition that the weight ratio of the graphene materials to the high-molecular compound is 1:0.01, 0.015 kg of PEG is obtained and put into the graphene material slurry to form the medium slurry. The medium slurry is hot-pressing dried at 50° C.~150° C.

Example 1-18

100 kg of graphene material slurry (the solvent is water) having a concentration of 1.5% by weight is provided. According to the condition that the weight ratio of the graphene materials to the high-molecular compound is 1:0.01, 0.015 kg of PEG is obtained and put into the graphene material slurry to form the medium slurry. The medium slurry is freeze dried at −10° C.~−80° C. Otherwise, petroleum ether is slowly added to the medium slurry during stirring until the graphene materials and the PEG are completely precipitated. Then the medium slurry is pumping filtrated and freeze dried at −10° C.~−80° C.

Example 1-19

100 kg of graphene material slurry (the solvent is water) having a concentration of 1% by weight is provided. According to the condition that the weight ratio of the graphene materials to the high-molecular compound is 1:0.1, 0.1 kg of PAM is obtained and put into the graphene material slurry to form the medium slurry. The medium slurry is spray dried by having the inlet air temperature of 300° C. and outlet air temperature of 200° C. in the spray drying to achieve the graphene composite powder form material.

Example 1-20

100 kg of graphene material slurry (the solvent is water) having a concentration of 1% by weight is provided. According to the condition that the weight ratio of the graphene materials to the high-molecular compound is 1:0.1, 0.1 kg of PAM is obtained and put into the graphene material slurry to form the medium slurry. Petroleum ether is slowly added to the medium slurry during stirring until the graphene materials and the PAM are completely precipitated. Then the medium slurry is pumping filtrated and dried in an oven at 30° C.~200° C. until the solvent is completely evaporated.

Example 1-21

100 kg of graphene material slurry (the solvent is water) having a concentration of 1% by weight is provided. According to the condition that the weight ratio of the graphene materials to the high-molecular compound is 1:0.1, 0.1 kg of PAM is obtained and put into the graphene material slurry to form the medium slurry. Petroleum ether is slowly added to the medium slurry during stirring until the graphene materials and the PAM are completely precipitated. Then the medium slurry is pumping filtrated and and granulated by using a granulator, followed by drying at 30° C.~200° C. until the solvent is completely evaporated. Otherwise, the co-flocculating step is omitted, and the medium slurry is directly granulated by using the granulator, followed by drying at 30° C.~200° C. until the solvent is completely evaporated.

Example 1-22

100 kg of graphene material slurry (the solvent is water) having a concentration of 1% by weight is provided. According to the condition that the weight ratio of the graphene materials to the high-molecular compound is 1:0.1, 0.1 kg of PAM is obtained and put into the graphene material slurry to form the medium slurry. The medium slurry is dried in an oven at 30° C.~200° C. until the solvent is completely evaporated.

Example 1-23

100 kg of graphene material slurry (the solvent is water) having a concentration of 1% by weight is provided. According to the condition that the weight ratio of the graphene materials to the high-molecular compound is 1:0.1, 0.1 kg of PAM is obtained and put into the graphene material slurry to form the medium slurry. The medium slurry is freeze dried at −10° C.~−80° C. Otherwise, petroleum ether is slowly added to the medium slurry during stirring until the graphene materials and the PAM are completely precipitated. Then the medium slurry is pumping filtrated and freeze dried at −10° C.~−80° C.

Example 1-24

100 kg of graphene material slurry (the solvent is water) having a concentration of 1% by weight is provided. According to the condition that the weight ratio of the graphene materials to the high-molecular compound is 1:0.1, 0.1 kg of PAM is obtained and put into the graphene material slurry to form the medium slurry. The medium slurry is hot-pressing dried at 50° C.~150° C.

Example 1-25

100 kg of graphene material slurry (the solvent is water) having a concentration of 2% by weight is provided. According to the condition that the weight ratio of the graphene materials to the high-molecular compound is 1:10, 20 kg of PVP is obtained and put into the graphene material slurry to form the medium slurry. The medium slurry is spray dried by having the inlet air temperature of 220° C. and outlet air temperature of 100° C. in the spray drying to achieve the graphene composite powder form material.

Example 1-26

100 kg of graphene material slurry (the solvent is water) having a concentration of 2% by weight is provided. According to the condition that the weight ratio of the graphene materials to the high-molecular compound is 1:10, 20 kg of PVP is obtained and put into the graphene material slurry to form the medium slurry. Cyclohexane is slowly added to the medium slurry during stirring until the graphene materials and the PVP are completely precipitated. Then the medium slurry is pumping filtrated and dried in an oven at 30° C.~200° C. until the solvent is completely evaporated.

Example 1-27

100 kg of graphene material slurry (the solvent is water) having a concentration of 2% by weight is provided. According to the condition that the weight ratio of the graphene materials to the high-molecular compound is 1:10, 20 kg of PVP is obtained and put into the graphene material slurry to form the medium slurry. Cyclohexane is slowly added to the medium slurry during stirring until the graphene materials and the PVP are completely precipitated. Then the medium slurry is pumping filtrated and and granulated by using a granulator, followed by drying at 30° C.~200° C. until the solvent is completely evaporated. Otherwise, the co-flocculating step is omitted, and the medium slurry is directly granulated by using the granulator, followed by drying at 30° C.~200° C. until the solvent is completely evaporated.

Example 1-28

100 kg of graphene material slurry (the solvent is water) having a concentration of 2% by weight is provided. According to the condition that the weight ratio of the graphene materials to the high-molecular compound is 1:10, 20 kg of PVP is obtained and put into the graphene material slurry to form the medium slurry. The medium slurry is dried in an oven at 30° C.~200° C. until the solvent is completely evaporated.

Example 1-29

100 kg of graphene material slurry (the solvent is water) having a concentration of 2% by weight is provided. According to the condition that the weight ratio of the graphene materials to the high-molecular compound is 1:10, 20 kg of PVP is obtained and put into the graphene material slurry to form the medium slurry. The medium slurry is hot-pressing dried at 50° C.~150° C.

Example 1-30

100 kg of graphene material slurry (the solvent is water) having a concentration of 2% by weight is provided. According to the condition that the weight ratio of the graphene materials to the high-molecular compound is 1:10, 20 kg of PVP is obtained and put into the graphene material slurry to form the medium slurry. The medium slurry is freeze dried at −10° C.~−80° C. Otherwise, petroleum ether is slowly added to the medium slurry during stirring until the graphene materials and the PVP are completely precipitated. Then the medium slurry is pumping filtrated and freeze dried at −10° C.~−80° C.

Example 1-31

100 kg of graphene material slurry (the solvent is NMP) having a concentration of 2.5% by weight is provided. According to the condition that the weight ratio of the graphene materials to the high-molecular compound is 1:2, 5 kg of PVDF-HFP is obtained and put into the graphene material slurry to form the medium slurry. Deionized water is slowly added to the medium slurry during stirring until the graphene materials and the PVDF-HFP are completely precipitated. Then the medium slurry is pumping filtrated and and dried at 30° C.~200° C. in an oven until the solvent is completely evaporated. Otherwise, the co-flocculating step is omitted, and the medium slurry is directly dried at 30° C.~200° C. until the solvent is completely evaporated.

Example 1-32

100 kg of graphene material slurry (the solvent is NMP) having a concentration of 2.5% by weight is provided. According to the condition that the weight ratio of the graphene materials to the high-molecular compound is 1:2, 5 kg of PVDF-HFP is obtained and put into the graphene material slurry to form the medium slurry. Deionized water is slowly added to the medium slurry during stirring until the graphene materials and the PVDF-HFP are completely precipitated. Then the medium slurry is pumping filtrated and and granulated by using a granulator, followed by drying at 30° C.~200° C. until the solvent is completely evaporated. Otherwise, the co-flocculating step is omitted, and the medium slurry is directly granulated by using the granulator, followed by drying at 30° C.~200° C. until the solvent is completely evaporated.

Example 1-33

100 kg of graphene material slurry (the solvent is NMP) having a concentration of 2.5% by weight is provided. According to the condition that the weight ratio of the graphene materials to the high-molecular compound is 1:2, 5 kg of PVDF-HFP is obtained and put into the graphene material slurry to form the medium slurry. The medium slurry is hot-pressing dried at 50° C.~150° C.

Example 1-34

100 kg of graphene material slurry (the solvent is NMP) having a concentration of 0.5% by weight is provided. According to the condition that the weight ratio of the graphene materials to the high-molecular compound is 1:50, 25 kg of PVDF is obtained and put into the graphene material slurry to form the medium slurry. Deionized water is slowly added to the medium slurry during stirring until the graphene materials and the PVDF are completely precipitated. Then the medium slurry is pumping filtrated and and dried at 30° C.~200° C. in an oven until the solvent is completely evaporated. Otherwise, the co-flocculating step is omitted, and the medium slurry is directly dried at 30° C.~200° C.

Example 1-35

100 kg of graphene material slurry (the solvent is NMP) having a concentration of 0.5% by weight is provided. According to the condition that the weight ratio of the graphene materials to the high-molecular compound is 1:50, 25 kg of PVDF is obtained and put into the graphene material slurry to form the medium slurry. Deionized water is slowly added to the medium slurry during stirring until the graphene materials and the PVDF are completely precipitated. Then the medium slurry is pumping filtrated and and granulated by using a granulator, followed by drying at 30° C.~200° C. until the solvent is completely evaporated. Otherwise, the co-flocculating step is omitted, and the medium slurry is directly granulated by using the granulator, followed by drying at 30° C.~200° C. until the solvent is completely evaporated.

Example 1-36

100 kg of graphene material slurry (the solvent is NMP) having a concentration of 0.5% by weight is provided. According to the condition that the weight ratio of the graphene materials to the high-molecular compound is 1:50, 25 kg of PVDF is obtained and put into the graphene material slurry to form the medium slurry. The medium slurry is hot-pressing dried at 50° C.~150° C.

Example 1-37

100 kg of graphene material slurry (the solvent is DMF) having a concentration of 1.5% by weight is provided. According to the condition that the weight ratio of the graphene materials to the high-molecular compound is 1:10, 15 kg of PMMA is obtained and put into the graphene material slurry to form the medium slurry. Deionized water is slowly added to the medium slurry during stirring until the graphene materials and the PMMA are completely precipitated. Then the medium slurry is pumping filtrated and and dried at 30° C.~200° C. in an oven until the solvent is completely evaporated. Otherwise, the co-flocculating step is omitted, and the medium slurry is directly dried at 30° C.~200° C. in the oven.

Example 1-38

100 kg of graphene material slurry (the solvent is DMF) having a concentration of 1.5% by weight is provided. According to the condition that the weight ratio of the graphene materials to the high-molecular compound is 1:10, 15 kg of PMMA is obtained and put into the graphene material slurry to form the medium slurry. Deionized water is slowly added to the medium slurry during stirring until the graphene materials and the PMMA are completely precipitated. Then the medium slurry is pumping filtrated and and granulated by using a granulator, followed by drying at 30° C.~200° C. until the solvent is completely evaporated. Otherwise, the co-flocculating step is omitted, and the medium slurry is directly granulated by using the granulator, followed by drying at 30° C.~200° C. until the solvent is completely evaporated.

Example 1-39

100 kg of graphene material slurry (the solvent is DMF) having a concentration of 1.5% by weight is provided. According to the condition that the weight ratio of the graphene materials to the high-molecular compound is 1:10, 15 kg of PMMA is obtained and put into the graphene material slurry to form the medium slurry. The medium slurry is hot-pressing dried at 50° C.~150° C.

Example 1-40

100 kg of graphene material slurry (the solvent is DMAc) having a concentration of 0.1% by weight is provided. According to the condition that the weight ratio of the graphene materials to the high-molecular compound is 1:1, 0.1 kg of EVAL is obtained and put into the graphene material slurry to form the medium slurry. Deionized water is slowly added to the medium slurry during stirring until the graphene materials and the EVAL are completely precipitated. Then the medium slurry is pumping filtrated and and dried at 30° C.~200° C. in an oven until the solvent is completely evaporated. Otherwise, the co-flocculating step is omitted, and the medium slurry is directly dried at 30° C.~200° C. in the oven.

Example 1-41

100 kg of graphene material slurry (the solvent is DMAc) having a concentration of 0.1% by weight is provided. According to the condition that the weight ratio of the graphene materials to the high-molecular compound is 1:1, 0.1 kg of EVAL is obtained and put into the graphene material slurry to form the medium slurry. Deionized water is slowly added to the medium slurry during stirring until the graphene materials and the EVAL are completely precipitated. Then the medium slurry is pumping filtrated and and granulated by using a granulator, followed by drying at 30° C.~200° C. until the solvent is completely evaporated. Otherwise, the co-flocculating step is omitted, and the medium slurry is directly granulated by using the granulator, followed by drying at 30° C.~200° C. until the solvent is completely evaporated.

Example 1-42

100 kg of graphene material slurry (the solvent is DMAc) having a concentration of 0.1% by weight is provided. According to the condition that the weight ratio of the graphene materials to the high-molecular compound is 1:1, 0.1 kg of EVAL is obtained and put into the graphene material slurry to form the medium slurry. The medium slurry is hot-pressing dried at 50° C.~150° C.

Example 1-43

100 kg of graphene material slurry (the solvent is DMAc) having a concentration of 3% by weight is provided. According to the condition that the weight ratio of the graphene materials to the high-molecular compound is 1:0.01, 0.03 kg of EVAL is obtained and put into the graphene material slurry to form the medium slurry. Deionized water is slowly added to the medium slurry during stirring until the graphene materials and the EVAL are completely precipitated. Then the medium slurry is pumping filtrated and and dried at 30° C.~200° C. in an oven until the solvent is completely evaporated. Otherwise, the co-flocculating step is omitted, and the medium slurry is directly dried at 30° C.~200° C. in the oven.

Example 1-44

100 kg of graphene material slurry (the solvent is DMAc) having a concentration of 3% by weight is provided. According to the condition that the weight ratio of the graphene materials to the high-molecular compound is 1:0.01, 0.03 kg of EVAL is obtained and put into the graphene material slurry to form the medium slurry. Deionized water is slowly added to the medium slurry during stirring until the graphene materials and the EVAL are completely precipitated. Then the medium slurry is pumping filtrated and and granulated by using a granulator, followed by drying at 30° C.~200° C. until the solvent is completely evaporated. Otherwise, the co-flocculating step is omitted, and the medium slurry is directly granulated by using the granulator, followed by drying at 30° C.~200° C. until the solvent is completely evaporated.

Example 1-45

100 kg of graphene material slurry (the solvent is DMAc) having a concentration of 3% by weight is provided. According to the condition that the weight ratio of the graphene materials to the high-molecular compound is 1:0.01, 0.3 kg of EVAL is obtained and put into the graphene material slurry to form the medium slurry. The medium slurry is hot-pressing dried at 50° C.~150° C.

Example 2-1

Figure 2:
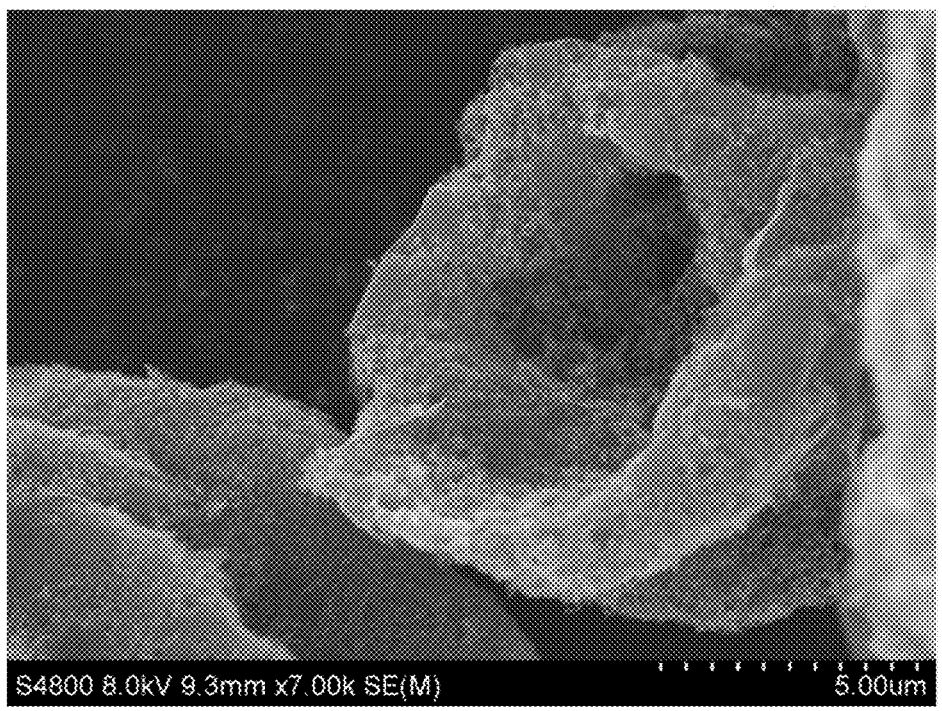
FIG. 2 is an SEM photo of the graphene composite powder form material in Example (1).
Figure 3:
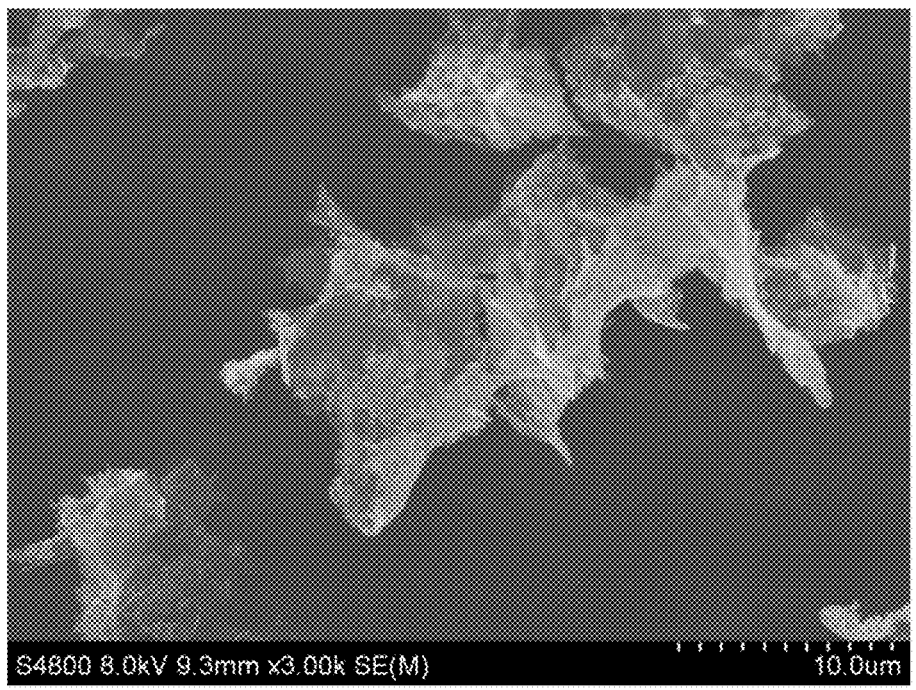
FIG. 3 is an SEM photo of the graphene composite powder form material of FIG. 2 dispersed in water.

0.1 g of PVP, 1 g of graphene materials, and 1 g of super-P are dispersed in 1 L of deionized water, uniformly stirred and then spray dried. The achieved graphene composite powder form material has a conductivity ≥3500 S/m and an apparent density of 0.17 g/cm$^3$. Referring to FIG. 2, the graphene composite powder form material has a good dispersing ability, and the super-P is attached to the surfaces of the graphene materials. Referring to FIG. 3, after being dispersed in the water, the graphene composite powder form material has a better dispersing ability.

Example 2-2

0.01 g of PVP, 1 g of graphene materials, and 0.1 g of super-P are dispersed in 1 L of deionized water, uniformly stirred and then spray dried. The achieved graphene composite powder form material has a conductivity ≥3500 S/m and an apparent density of 0.15 g/cm$^3$.

Example 2-3

100 g of PVP, 1 g of graphene materials, and 5 g of super-P are dispersed in 1 L of deionized water, uniformly stirred and then freeze dried. The achieved graphene composite powder form material has a conductivity ≥2500 S/m and an apparent density of 0.2 g/cm$^3$.

Example 2-4

100 g of PVP, 1 g of graphene materials, and 2 g of super-P are dispersed in 1 L of deionized water, uniformly stirred and then spray dried. The achieved graphene composite powder form material has a conductivity ≥2500 S/m and an apparent density of 0.18 g/cm$^3$.

Example 2-5

10 g of PVP, 1 g of graphene materials, and 1 g of super-P are dispersed in 500 ml of deionized water, uniformly stirred and then spray dried. The achieved graphene composite powder form material has a conductivity ≥3500 S/m and an apparent density of 0.17 g/cm$^3$.

Example 2-6

0.01 g of PVP, 1 g of graphene materials, and 0.5 g of super-P are dispersed in 500 ml of deionized water, uniformly stirred and then spray dried. The achieved graphene composite powder form material has a conductivity ≥3500 S/m and an apparent density of 0.16 g/cm$^3$.

Example 2-7

100 g of PVP, 1 g of graphene materials, and 4 g of super-P are dispersed in 500 ml of deionized water, uniformly stirred and then freeze dried. The achieved graphene composite powder form material has a conductivity ≥2500 S/m and an apparent density of 0.19 g/cm$^3$.

EXample 2-8

30 g of PVP, 1 g of graphene materials, and 3 g of super-P are dispersed in 500 ml of deionized water, uniformly stirred and then spray dried. The achieved graphene composite powder form material has a conductivity ≥2500 S/m and an apparent density of 0.2 g/cm$^3$.

Example 2-9

Figure 4:
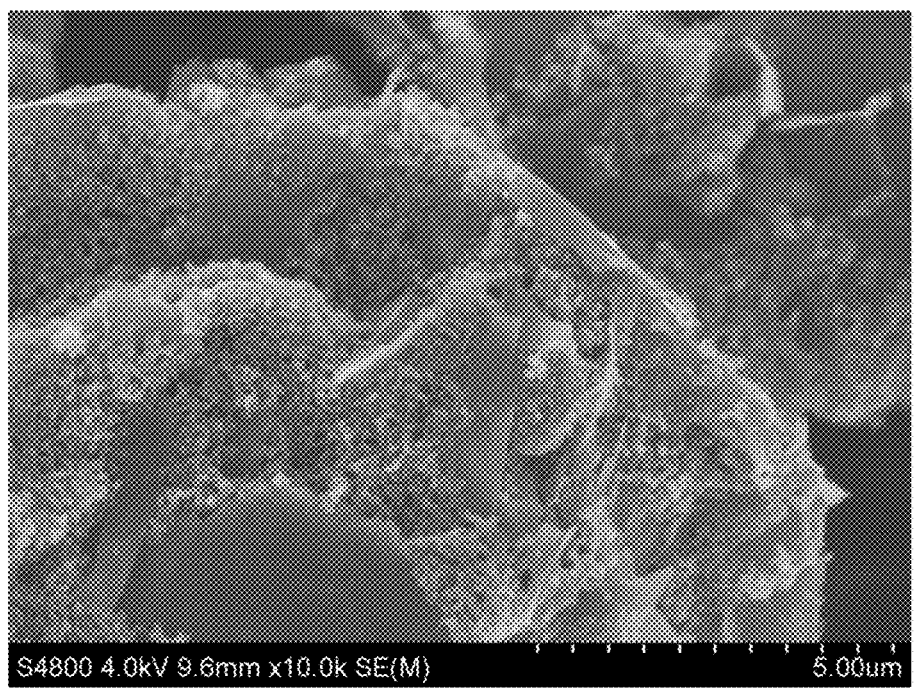
FIG. 4 is an SEM photo of the graphene composite powder form material in Example (9).
Figure 5:
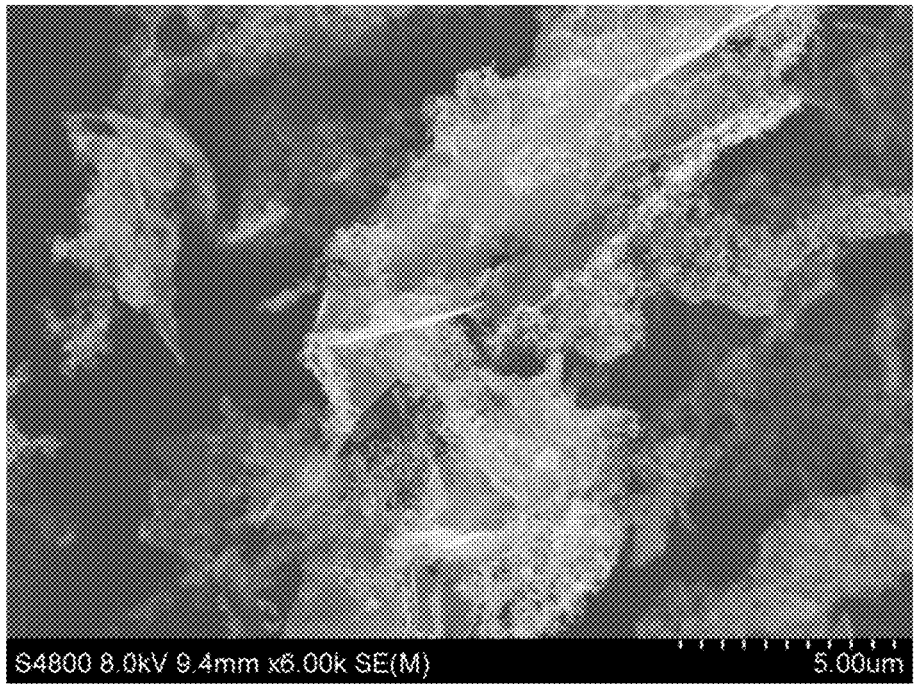
FIG. 5 is an SEM photo of the graphene composite powder form material of FIG. 4 dispersed in water.

0.1 g of maleic acid, 1 g of graphene materials, and 1 g of super-P are dispersed in 1 L of deionized water, uniformly stirred at 30° C.~50° C. for 0.1 hours 2 hours to form a mixture. Then, ammonium persulfate is added to the mixture and reacted at 40° C.~60° C. for 1 hour~10 hours. A weight ratio of the ammonium persulfate to the maleic acid is 1:100. Finally, the mixture is spray dried. The achieved graphene composite powder form material has a conductivity ≥2500 S/m and an apparent density of 0.2 g/cm$^3$. Referring to FIG. 4, the graphene composite powder form material has a good dispersing ability, and the super-P is attached to the surfaces of the graphene materials. Referring to FIG. 5, after being dispersed in the water, the graphene composite powder form material has a better dispersing ability.

Example 2-10

Figure 6:
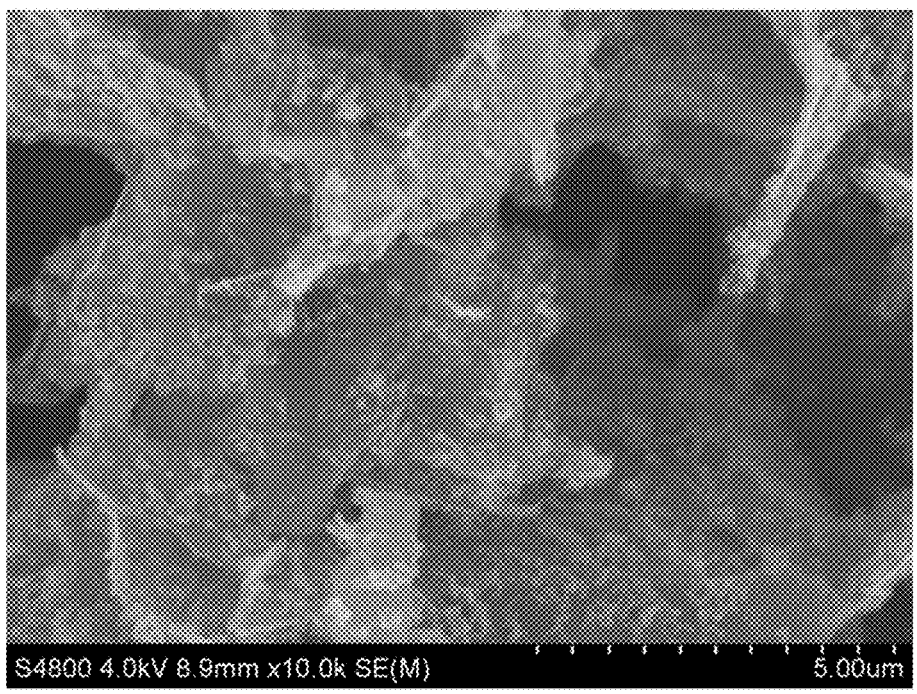
FIG. 6 is an SEM photo of the graphene composite powder form material in Example (10).

0.1 g of acrylic acid, 1 g of graphene materials, and 5 g of carbon black are dispersed in 1 L of deionized water, uniformly stirred at 30° C.~50° C. for 0.1 hours 2 hours to form a mixture. Then, ammonium persulfate is added to the mixture and reacted at 30° C.~100° C. for 1 hour~10 hours. A weight ratio of the ammonium persulfate to the acrylic acid is 1:100. Finally, the mixture is freeze dried. The achieved graphene composite powder form material has a conductivity ≥2500 S/m and an apparent density of 0.1 g/cm$^3$. Referring to FIG. 6, the graphene composite powder form material has a good dispersing ability.

Example 2-11

0.01 g of maleic acid, 0.1 g of graphene materials, and 5 g of super-P are dispersed in 1 L of deionized water, uniformly stirred at 30° C.~50° C. for 0.1 hours 2 hours to form a mixture. Then, azobisisobutyronitrile is added to the mixture and reacted at 40° C.~60° C. for 1 hour~10 hours. A weight ratio of the azobisisobutyronitrile to the maleic acid is 1:10. Finally, the mixture is dried at 40° C.~150° C.

Example 2-12

0.01 g~0.1 g of fumaric acid, 1 g of graphene materials, and 0.2 g~10 g of carbon black are dispersed in 1 L of deionized water, uniformly stirred at 30° C.~50° C. for 0.1 hours~2 hours to form a mixture. Then, azobisisobutyronitrile is added to the mixture and reacted at 30° C.~100° C. for 1 hour~10 hours. A weight ratio of the azobisisobutyronitrile to the fumaric acid is 1:10. Finally, the mixture is spray dried.

Example 2-13

0.01 g~0.1 g of fumaric anhydride, 1 g of graphene materials, and 0.5 g~2 g of carbon black are dispersed in 1 L of deionized water, uniformly stirred at 30° C.~50° C. for 0.1 hours~2 hours to form a mixture. Then, 2,2'-azobisisoheptonitrile is added to the mixture and reacted at 40° C.~60° C. for 1 hour~10 hours. A weight ratio of the 2,2'-azobisisoheptonitrile to the fumaric acid is 1:20~1:50. Finally, the mixture is freeze dried.

Example 2-14

0.01 g~0.1 g of methacrylic acid, 1 g of graphene materials, and 0.3 g~3 g of carbon black are dispersed in 1 L of deionized water, uniformly stirred at 30° C.~50° C. for 0.1 hours~2 hours to form a mixture. Then, 2,2'-azobisisoheptonitrile is added to the mixture and reacted at 30° C.~100° C. for 1 hour~10 hours. A weight ratio of the 2,2'-azobisisoheptonitrile to the methacrylic acid is 1:20~1:50. Finally, the mixture is dried at 40° C.~100° C.

Example 2-15

0.01 g~0.1 g of diallyl dimethyl ammonium chloride, 1 g of graphene materials, and 0.2 g~10 g of nano sized diamonds are dispersed in 1 L of deionized water, uniformly stirred at 30° C.~50° C. for 0.1 hours~2 hours to form a mixture. Then, 2,2'-azobis(2-methylpropionamidine) dihydrochloride is added to the mixture and reacted at 40° C.~60° C. for 1 hour~10 hours. A weight ratio of the 2,2'-azobis(2-methylpropionamidine) dihydrochloride to the diallyl dimethyl ammonium chloride is 1:20~1:50. Finally, the mixture is spray dried.

Example 2-16

0.01 g~0.1 g of acrylonitrile, 1 g of graphene materials, and 0.5 g~2 g of nano sized diamonds are dispersed in 1 L of deionized water, uniformly stirred at 30° C.~50° C. for 0.1 hours~2 hours to form a mixture. Then, 2,2'-azobis(2-methylpropionamidine) dihydrochloride is added to the mixture and reacted at 30° C.~100° C. for 1 hour~10 hours. A weight ratio of the 2,2'-azobis(2-methylpropionamidine) dihydrochloride to the acrylonitrile is 1:20~1:50. Finally, the mixture is freeze dried.

Example 2-17

0.01 g~0.1 g of acrylamide, 1 g of graphene materials, and 0.3 g~3 g of nano sized diamonds are dispersed in 1 L of deionized water, uniformly stirred at 30° C.~50° C. for 0.1 hours~2 hours to form a mixture. Then, 2,2'-azobis(2-methylpropionamidine)dihydrochloride is added to the mixture and reacted at 40° C.~60° C. for 1 hour~10 hours. A weight ratio of the 2,2'-azobis(2-methylpropionamidine)dihydrochloride to the acrylamide is 1:20~1:50. Finally, the mixture is dried at 40° C.~150° C.

Example 2-18

0.01 g~0.1 g of methacrylamide, 1 g of graphene materials, and 0.5 g~2 g of nano sized diamonds are dispersed in 1 L of deionized water, uniformly stirred at 30° C.~50° C. for 0.1 hours~2 hours to form a mixture. Then, 2,2'-azobis[2-(2-imidazolin-2-yl)propane] dihydrochloride is added to the mixture and reacted at 30° C.~100° C. for 1 hour~10 hours. A weight ratio of the 2,2'-azobis[2-(2-imidazolin-2-yl)propane]dihydrochloride to the methacrylamide is 1:20~1:50. Finally, the mixture is spray dried.

Example 2-19

0.05 g~0.8 g of diacetone acrylamide, 1 g of graphene materials, and 0.5 g~2 g of nano sized diamonds are dispersed in 1 L of deionized water, uniformly stirred at 30° C.~50° C. for 0.1 hours~2 hours to form a mixture. Then, 2,2'-azobis[2-(2-imidazolin-2-yl)propane]dihydrochloride is added to the mixture and reacted at 40° C.~60° C. for 1 hour~10 hours. A weight ratio of the 2,2'-azobis[2-(2-imidazolin-2-yl)propane]dihydrochloride to the diacetone acrylamide is 1:20~1:50. Finally, the mixture is freeze dried.

Example 2-20

0.05 g~0.8 g of N-isopropyl acrylamide, 2 g of graphene materials, and 0.5 g~2 g of carbon black are dispersed in 1 L of deionized water, uniformly stirred at 30° C.~50° C. for 0.1 hours~2 hours to form a mixture. Then, 2,2'-azobis[2-(2-imidazolin-2-yl)propane]dihydrochloride is added to the mixture and reacted at 30° C.~100° C. for 1 hour~10 hours. A weight ratio of the 2,2'-azobis[2-(2-imidazolin-2-yl)propane]dihydrochloride to the N-isopropyl acrylamide is 1:20~1:50. Finally, the mixture is spray dried.

Example 2-21

Ethylenediamine and super-P nano grains are uniformly mixed in a weight ratio of 10:1~100:1, stirred at 40° C.~100°

C. for 2 hours~6 hours, washed, and filtered to achieve modified super-P nano grains. Water and ethanol in a weight ratio of the water to the ethanol of 1:5~1:8 are mixed to obtain an ethanol water solution. Phenyl trimethoxysilane is added to the ethanol water solution to form a first solution. A weight ratio of the phenyl trimethoxysilane to the ethanol water solution is 1:1~10:1. The first solution is added to a graphene containing water solution and heated at 80° C.~120° C. for 1 hour~3 hours to achieve the modified graphene containing solution. A weight percentage of the graphene containing water solution is 0.5%~3%. A weight ratio of the graphene materials to the silane coupling agent is 5:1~20:1. The modified super-P nano grains are added to the modified graphene containing solution and stirred for 2 hours to 6 hours to have a reaction. After being dried, the graphene composite powder form material is achieved.

Example 2-22

Triethylenetetramine and nano sized diamonds are uniformly mixed in a weight ratio of 5:1~10:1, stirred at 40° C.~100° C. for 2 hours~6 hours, washed, and filtered to achieve modified nano sized diamonds. Water and ethanol in a weight ratio of the water to the ethanol of 1:5~1:8 are mixed to obtain an ethanol water solution. Phenyl triethoxysilane is added to the ethanol water solution to form a first solution. A weight ratio of the phenyl triethoxysilane to the ethanol water solution is 1:1~10:1. The first solution is added to a graphene containing water solution and heated at 80° C.~120° C. for 1 hour~3 hours to achieve the modified graphene containing solution. A weight percentage of the graphene containing water solution is 0.5%~3%. A weight ratio of the graphene materials to the silane coupling agent is 5:1~20:1. The modified nano sized diamonds are added to the modified graphene containing solution and stirred for 2 hours to 6 hours to have a reaction. After being dried, the graphene composite powder form material is achieved.

The above embodiments are only illustrated to help understanding the method and the essential idea of the present invention. One of ordinary skill in the art can make other variations in the spirit of the present invention, these variations based upon the spirit of the present invention are all included in the claimed protect scope of the present invention. The above descriptions are only preferred embodiments, thus cannot limit the claim scope of the application. All the equivalent modifications and variations made by one of ordinary skill in the art based on the spirit of the present invention are belonged to the claim scope of the application.

What is claimed is:

1. A graphene composite powder form material comprising a plurality of chemical modified graphene materials and a polymer, wherein the polymer is uniformly coated on surfaces of the chemical modified graphene materials, any adjacent chemical modified graphene materials are separated by the polymer, and an apparent density of the graphene composite powder form material is 0.05 g/cm$^3$ to 0.2 g/cm$^3$, the graphene composite powder form material is obtained by:
    preparing a chemical modified graphene slurry having a concentration of 0.1% to 3% by weight, and forming a medium slurry by adding the polymer and micro/nano structure materials to the chemical modified graphene slurry according to a weight ratio of chemical modified graphene materials to the polymer of about 1:0.01 to about 1:100, wherein a weight ratio of the micro/nano structure materials to the graphene materials is 0.1:1 to 5:1;
    adding a poor solvent into the medium slurry during stirring of the medium slurry, to co-flocculate the chemical modified graphene materials and the polymer to form graphene/polymer flocculation assemblies;
    filtering the medium slurry to achieve the graphene/polymer flocculation assemblies; and
    drying the graphene/polymer flocculation assemblies, to achieve the graphene composite powder form material.

2. The graphene composite powder form material of claim 1, wherein each of the plurality of chemical modified graphene materials has a grain shape or a semi-sphere shape with a diameter in a range from 10 μm to 300 μm.

3. The graphene composite powder form material of claim 2, wherein the weight ratio of the chemical modified graphene materials to the polymer is 1:0.1 to 1:10.

4. The graphene composite powder form material of claim 1, wherein the polymer is a water soluble high-molecular compound selected from the group consisting of polyvinyl alcohol (PVA), polyethylene glycol (PEG), polyacrylamide (PAM), polyvinyl pyrrolidone (PVP), cellulose acetate (CA), carboxymethylcellulose sodium (CMC), polyglutamic acid, and combinations thereof.

5. The graphene composite powder form material of claim 1, wherein the polymer is an oil soluble high-molecular compound selected from the group consisting of vinylidene fluoride-hexafluoropropylene copolymer (PVDF-HFP), polyvinylidene fluoride (PVDF), polymethyl methacrylate (PMMA), polyacrylic acid sodium resins, ethylene-vinyl alcohol copolymer (EVAL), polyvinyl alcohol (PVA), polyethylene glycol (PEG), polyacrylamide (PAM), polyvinyl pyrrolidone (PVP), cellulose acetate (CA), carboxymethylcellulose sodium (CMC), polyglutamic acid, and combinations thereof.

6. The graphene composite powder form material of claim 1, wherein the poor solvent is selected from the group consisting of water, ethanol, diethyl ether, petroleum ether, cyclohexane, hexane, acetone, and combinations thereof.

7. The graphene composite powder form material of claim 1, wherein the graphene slurry comprises a water soluble graphene slurry or an oil soluble graphene slurry.

* * * * *